UNITED STATES PATENT OFFICE.

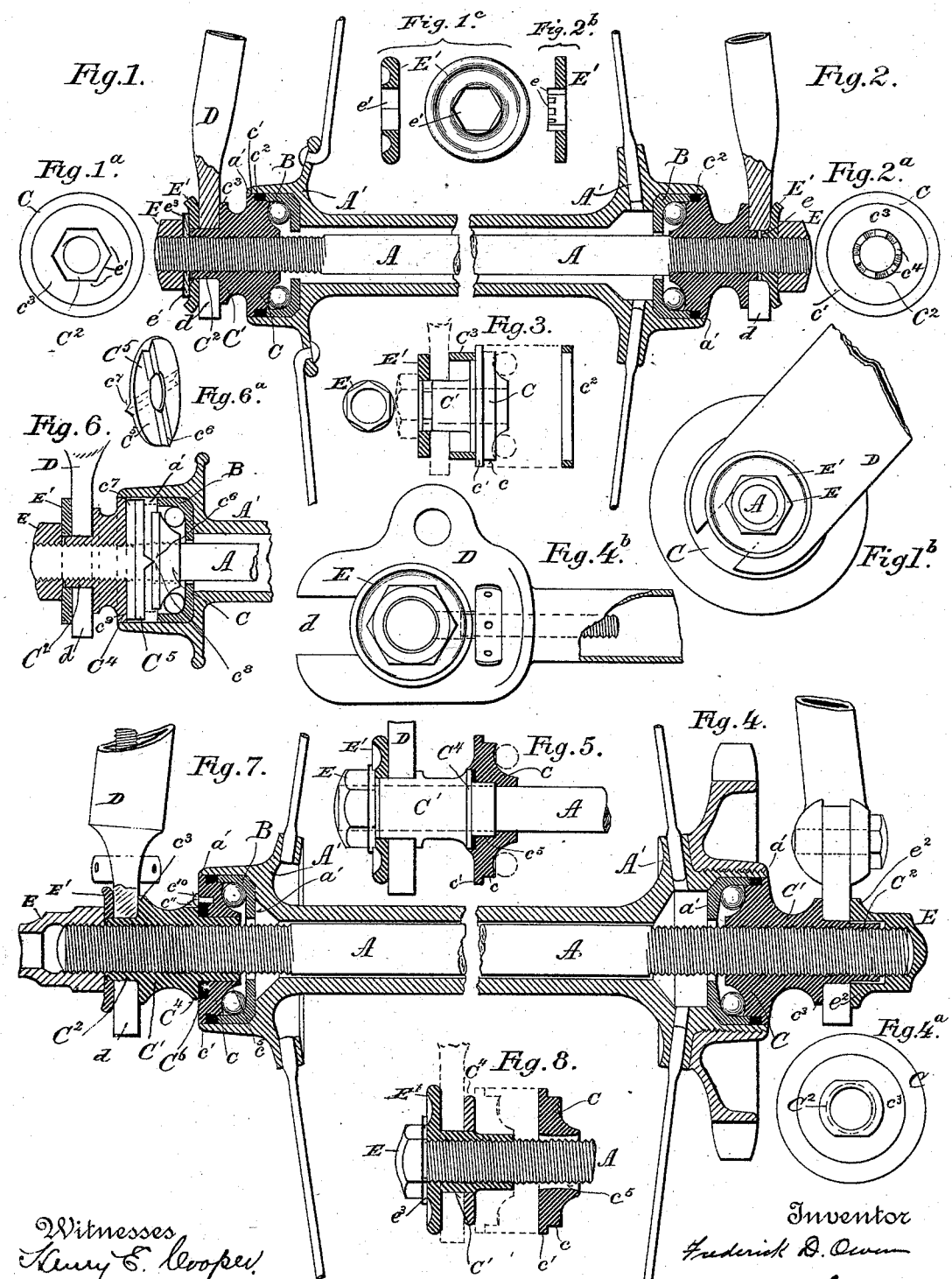

FREDERICK D. OWEN, OF WASHINGTON, DISTRICT OF COLUMBIA.

BEARING FOR VELOCIPEDES.

SPECIFICATION forming part of Letters Patent No. 519,269, dated May 1, 1894.

Application filed March 29, 1893. Serial No. 468,157. (No model.)

*To all whom it may concern:*

Be it known that I, FREDERICK D. OWEN, a citizen of the United States, residing at Washington, District of Columbia, have invented certain new and useful Improvements in Bearings for Velocipedes; and I do hereby declare the following to be a full, clear, and exact description of the invention, such as will enable others skilled in the art to which it appertains to make and use the same.

This invention relates to bearings for velocipedes, and has special reference to the cones ordinarily forming a part of said bearings.

One object of this invention is to provide for more perfect exclusion of dust from the wearing surfaces of the bearing.

Another object of the invention is to render the cones more ready of access for adjustment upon the axle, or for other manipulations.

Another object of the invention is to compensate for slight unevenness or imperfections in the balls, or the ball races of velocipede bearings.

With these and minor objects in view, the invention consists in the matters to be hereinafter described in detail, and then set forth in the claims.

In the accompanying drawings:—Figure 1— is a longitudinal section through one end of a wheel hub and its bearings, illustrating one form in which parts of my invention may be embodied. Fig. 1$^a$— is an end view of the cone shown in Fig. 1. Fig. 1$^b$— is a side elevation of the fork end illustrated in Fig. 1, showing the cone locked thereto. Fig. 1$^c$— represents the adjusting washer in section and elevation. Fig. 2— is a section through one end of a wheel hub and its bearing, illustrating another form in which parts of my invention may be embodied. Fig. 2$^a$— is an end view of the cone shown in Fig. 2. Fig. 2$^b$— is a section of the washer shown in Fig. 2. Fig. 3— is a sectional detail illustrating a slight modification in the shape of the cone shank or barrel. Fig. 4— is a longitudinal section through one end of a rear wheel hub and its bearings, illustrating features of my invention. Fig. 4$^a$— is an end view of the cone shown in Fig. 4. Fig. 4$^b$— is a side elevation of the fork end and some of the parts shown in Fig. 4. Fig. 5— is a detail of a cone partly in section, illustrating certain features of my invention. Figs. 6, 7 and 8— are sections illustrating further details of the cone shown in Fig. 5. Fig. 6$^a$— is a perspective detail of the washer shown in Fig. 6.

While I have chosen to illustrate the several features of my invention in connection with bearings having balls interposed between the male and female parts thereof, it will be understood that my improvements are applicable to bearings in which a male cone-shaped member is in direct contact within a conical socket. I wish it also to be understood that while my invention has more especial reference to what are known as the "adjusting cones" of bearings, certain features thereof also apply to the "fixed cones" of bearings, as will be apparent.

That part of my invention relating to the exclusion of dust and other foreign matter from the bearings is illustrated in the figures in which the cones are shown in section.

In carrying out this part of my invention the usual form of wheel axle A and hub A' may be employed, the hub A' being provided at the ends with annular recesses $a'$ within which hardened steel ball cups or cases B are seated, as usual. The heads C of the cone are, just outside of their ball tracks or races, turned to form an annular shoulder $c$, terminating at its inner end in a flange $c'$, the inner end of said shoulder $c$ being engaged to fit freely within the outer end of the ball cup B, but without lateral play, and the flange $c'$ being turned to fit similarly within the outer end of the cylindric recess $a'$ of the hub A'. While the shoulder $c$ and flange $c'$ are adapted to enter freely within the ball case B and recess $a'$ and are not in contact therewith when the bearings are properly adjusted, they form in effect, so far as the exclusion of dust and dirt from the bearings is concerned, interlocking parts, and will be so designated herein.

The shoulder $c$ is so proportioned with relation to other adjacent parts as to admit of the interposition of a washer $c^2$ between the outer end of the cup or case B and the flange $c'$ of the cone, said washer being preferably composed of felt or some fibrous material, such as is used in similar washers now commonly employed, that will arrest any dust which may work in between the flange $c'$ of the cone and the overhanging walls of the recess $a'$ of the hub, and will not become hardened, and inoperative for the purpose desired, when saturated with oil which may work out from the bearings.

The parts above described form double interlocking surfaces, designed to exclude dust from the bearings, having interposed between them fibrous washers to arrest such particles as may pass the outer interlocking surfaces, comprising flange $c'$ and the walls of recess $a'$, and prevent access thereof to the inner interlocking parts or surfaces comprising shoulder $c$ and the mouth of the ball cup B; said washer also serving in a measure to prevent the escape of oil from the bearings. So constructed, there is but little liability of shreds or particles which may be detached from the washer $c^2$, working into the bearings to clog the same.

Another separate feature of my invention, and one which I will claim broadly herein relates more particularly to the construction of the outer ends of the cones, whereby said cones are rendered more readily accessible for adjustments.

Cones now in use commonly terminate at their outer ends in a flat face, against which the fork is clamped, said fork serving as a fixed abutment or washer to transmit the pressure of a jam nut to the cone to lock it against rotation upon the axle. These cones are usually throughout the greater portion of their length turned down to small diameter for the sake of lightness and elegance of appearance, and are provided at their outer ends with a milled flange to afford a grip for the fingers in making the necessary adjustments. There is ordinarily but little space between the wheel hub and the fork, so that the milled flange of the cone is difficult of access under the most favorable conditions; but in cases where said milled flange is located close to the fork, and the fork is of greater diameter than the flange (a quite common construction) the difficulty of making adjustments is greatly increased. Moreover, in the construction above referred to, oil escapes from the bearings and collects dust upon the exposed parts or surface of the cone, necessitating the soiling of the hands in making adjustments. With cones constructed in accordance with this part of my invention the foregoing objections are avoided inasmuch as the milled edge or flange, or other device designed to afford a grip, is located outside of the fork, instead of between the fork and the wheel hub, as heretofore. In carrying out this part of my invention the outer end of the shank or barrel $C'$ of the cone is turned down to form a tubular boss $C^2$, adapted to pass through the slot or opening $d$ commonly provided in the fork end D for the reception of the wheel axle A, said tubular boss terminating at its inner end in an annular flange $c^3$ designed to abut against the inner side of said fork end and be clamped tightly thereagainst by means of a jam nut E, or a nut E and a washer $E'$, to lock the cone against rotation after adjustment.

To provide for the necessary adjustment of the cone the tubular boss $C^2$ is at its outer end dressed or finished to present an irregular surface adapted to be engaged by a suitable tool or device by which the cone may be rotated on the threads of the axle A upon which it is threaded. As shown in Figs. 2 and 2ᵃ this irregular surface is obtained by providing the outer end of the tubular boss $C^2$ with notches $c^4$ to be engaged by corresponding projections $e$ formed on the inner face of a milled washer $E'$ located at the outer side of the fork end D, it being apparent that when said washer and cone are in engagement the rotation of the washer $E'$ will cause a corresponding rotation of the cone. The parts are so proportioned that upon tightening the nut E the fork end D will be clamped tightly between the cone and washer, the cone thus being locked against rotation.

In the construction shown in Figs. 1 and 1ᵃ the tubular boss $C^2$ is dressed in hexagonal form exteriorly to receive a milled washer $E'$ having a similarly shaped central opening $e'$. In this instance the tubular boss $C^2$ is dressed to such length that the jam nut E will bear only upon the washer $E'$, as indicated, thus admitting of the cone being tightly locked against the fork end D, as in the form before described.

In the construction shown in Fig. 4 the tubular boss $C^2$ is extended somewhat, and provided at opposite sides with flat faces to receive a wrench. In this instance the milled washer $E'$ is dispensed with, the jam nut E being provided with a tubular extension $e^2$ to inclose said tubular boss $C^2$ and abut against the outer face of the fork end D.

A modified form of cone is shown in Fig. 3 wherein the body or barrel $C'$ is turned to cylindric form throughout, a short section of tubing $C^3$ being interposed between the flanged head C of the cone and the fork end D. This construction is designed chiefly to secure a reduction in the weight of the parts.

It will be seen that in the construction above described the adjusting means is located at the outer side of the fork, a position easy of access, and that there is much less liability of the milled adjusting washer becoming clogged, with oil and dirt. Moreover, as the fork end D rests upon the tubular boss $C^2$ of the cone, all liability of bruising or mashing the thread of axle A, from contact with said fork end D, is avoided, so that the cone may at all times be readily adjusted on or removed from the axle without the aid of tools. In Fig. 1 a D washer $e^3$ is interposed between the jam nut E and the washer $E'$, but this I do not deem essential because there is much greater friction between the fork end D and the flange $e^3$ and washer E', than between the nut E and washer E', and therefore the cone and washer would not be apt to turn upon tightening the nut against the washer.

A material advantage is derived from a special construction of the adjusting cones whereby a more perfect fit between the threads of the cone and axle or shaft can be made, thus greatly facilitating adjustment or removal of the cones, and at the same time the cost of manufacturing is lessened without detracting from the excellence of quality thereof. The usual course followed in the manufacture of these cones is to turn them out from bars or blanks of high grade or tool steel, and tap them axially, then temper them to produce the requisite hardness of surface to the ball tracks or races. In this process of tempering the thread is apt to become clogged with grit from the fire, or to scale slightly, and said thread is apt also to become slightly distorted or warped, the result being that the thread of the cones does not accurately fit the thread of the axle for which it was gaged, and in consequence the cone will bind upon said axle. Figs. 5, 6, 7 and 8 wherein the cone is shown as made in two separate parts, illustrate this feature the head C being turned out from one bar or blank of metal, and the barrel C' being turned out from another and separate bar or blank of metal, or other material. The head C of the cone is formed from a bar or blank of steel of fine grain or texture, and relatively high cost, such as the tool steel usually employed in the manufacture of the best grade of cones now in use. The barrel C' of the cone may be formed from a bar or blank of lower grade and less expensive steel, thus reducing the cost of material required to construct a cone, and as said barrel C' can be turned from a bar of less diameter than that required for the head C of the cone, a saving of labor and material is also effected by this construction. The barrel C' is at its inner end turned down to a diameter but little greater than the axle A it is to fit, the cone head C being provided with a central bore $c^5$ within which said inner end of the barrel C' fits snugly.

The cone head C after being properly tempered may be shrunk or soldered on to the inner end of the barrel C' or otherwise secured thereon said barrel being left untempered so that the threads therein are devoid of grit and remain sharp and true just as they leave the tap. This insures the accurate and easy fit of the threads of the cone upon the thread of the axle A, and involves as before stated a saving of cost in material and labor. In practice my purpose is to so secure the cone head C upon its barrel C' that it may be readily removed when worn and replaced with another, thus greatly facilitating and cheapening repairs, and for this reason I prefer to secure the cone head upon its barrel by means of solder rather than by shrinking, or to mount it loosely thereon. By a slight modification of this construction, as illustrated in Figs. 6, 7, and 8, I am enabled to compensate for such slight variations in the size of the balls used in such bearings as would escape detection by the average user or repairer of bicycles. This I accomplish by so securing the cone head C upon the barrel C' that it may have a slight endwise or rocking motion thereon, so that while the entire surface of the ball track of the cone head C, is (with balls of even diameter) normally maintained at a given distance from the ball track of the cup or case B, upon the accidental insertion in the bearing of a ball of slightly greater diameter than its fellows, or in the event of setting the ball cup B slightly out of true, the cone head will move or yield slightly to accommodate such imperfections of the bearing thus avoiding excess of pressure upon the bearing surface at any one point. This feature of my invention may be carried into effect in various ways, some of which I have illustrated herein as for instance in the form illustrated in Fig. 6 I attain the end sought for by interposing between the cone head C and a shoulder or flange $C^4$ of the barrel C' a washer $C^5$ the opposite faces of which are provided with ribs $c^6$ and $c^7$, preferably knife edged, arranged at right angles to each other, as shown in the perspective detail Fig. $6^a$. By providing the back of the cone head C with a slight transverse notch $c^8$ and the face of the flange $C^4$ of the barrel with a similar notch $c^4$, for the engagement of the respective ribs $c^6$ and $c^7$, the cam head C will be held securely against rotation when the bearing is properly adjusted, while a limited play of the cone head C is permitted the parts described operating after the manner of a universal joint.

In the instance illustrated in Fig. 7 a washer $C^6$ of rubber, felt or some other elastic or springy material is interposed between the back of the cone head C and the face of the flange $C^4$, a pin or screw $c^{10}$ secured to the cone head C and resting in a notch $c^{11}$ of the flange, or vice versa, serving to lock the cone head against rotation on the barrel C'. A coiled spring or split washer may be used instead of the rubber washer $C^6$.

In the form shown in Fig. 8 the bore $c^5$ of the cone head flares slightly in both directions from the center to provide for the rocking or yielding of said cone head upon the barrel C' as stated. In this figure the cone barrel C' and flange E' are shown as formed from a single piece of metal, a D-washer $e^3$ being interposed between the flange and jam nut and a compressible washer $C^4$ being interposed between the back of the cone head C and the fork end D.

While the several features of my invention are designed for embodiment as an entirety in a single cone, it will be apparent that said several features are capable of use independently of each other. It will be also understood that in constructing these cones, a tempered cone head such as described can be mounted on a cone body or barrel of other metal than steel, such as brass or aluminum, or indeed it may be mounted upon a body of vulcanized fiber or compressed paper, or wood. It will be also understood, that in lieu of mounting the male member or cone head C of a bearing to rock upon its support (the cone barrel C') to maintain the parallelism of the bearing surfaces or ball tracks, or to equalize the pressure of said surfaces at opposite sides of the axis of rotation, the female member, or bearing cup B may be so mounted to attain the same end.

What I claim is—

1. A bearing consisting solely of a female member having two substantially parallel annular surfaces arranged stepwise, and a male member formed of a single block of metal also provided with two substantially parallel annular surfaces arranged stepwise to fit within the annular surfaces of the female member, substantially as described.

2. A bearing having double interlocking surfaces and an interposed packing or washer substantially as described.

3. A bearing comprising a socket having a cup or case seated therein, and a cone having an annular shoulder to fit within the mouth of the cup and a flange to fit within the mouth of the socket, substantially as described.

4. A bearing comprising a socket having a cup or case seated therein, a cone having an annular shoulder fitting within the mouth of the cup and a flange fitting within the mouth of the socket, and a washer seated on the annular shoulder of the cone and confined between the outer end of the cup and the face of the cone flange, substantially as described.

5. An adjusting cone for bearings comprising an adjustable barrel provided at one end with a cone head and at the other end with a tubular extension adapted to support a fork end, said tubular extension having at its outer end an irregular surface for the engagement of an adjusting implement, substantially as described.

6. An adjusting cone for bearings comprising a threaded barrel provided at one end with a cone head and at the other end with a tubular extension adapted to support a fork end, said tubular extension having at its outer end an irregular surface, and a metal adjusting washer fitting the irregular surface of said tubular extension and adapted to rotate the cone to adjust it longitudinally upon the axle, substantially as described.

7. An adjusting cone for bearings comprising a barrel provided with a tubular extension adapted to support a fork end or the like, said tubular extension having at its outer end an irregular surface to receive a washer shaped to engage said irregular surface, substantially as described.

8. The combination with a bicycle fork, and axle, or other relatively fixed objects, of an adjusting cone provided with a flange and with a tubular extension projecting outward from said flange to receive or support said fork, said tubular extension having at its outer end a hexagonal or other irregular surface, a washer having an irregular surface to engage that of the cone, and a jam nut threaded upon the axle and adapted to bind upon the washer, substantially as described.

9. An adjustable bearing comprising male and female members shaped to form double interlocking surfaces, said male member being provided at the outer end with a tubular extension having an irregular surface for the engagement of an adjusting implement, substantially as described.

10. An adjustable bearing comprising male and female members shaped to form double interlocking surfaces, and a packing or washer interposed between said interlocking surfaces, said male member being provided at its outer end with a tubular extension having an irregular surface for the engagement of an adjusting implement, substantially as described.

11. An adjustable bearing comprising a socket having a case or cup seated therein, and a cone the head of which is provided with an annular shoulder to enter the mouth of the cup and with a flange to enter the mouth of the socket, and a washer seated on said shoulder between the mouth of the cup and the flange of the cone, the cone barrel being provided at its outer end with a tubular extension having an irregular surface for the engagement of an adjusting implement, substantially as described.

12. An adjustable bearing comprising male and female members shaped to form double interlocking surfaces, said male member being provided with a tubular extension having an irregular surface at its outer end, and a metal washer shaped to engage said irregular surface, substantially as described.

13. An adjustable bearing comprising male and female members shaped to form double interlocking surfaces, said male member being provided with a tubular extension adapted to support a fork end and having at its outer end an irregular surface, and a washer shaped to engage said outer end of the tubular extension, substantially as described.

14. An adjusting cone for bearings comprising a tubular barrel internally threaded for engagement with a threaded shaft and provided at one end with a tubular extension adapted to support a fork end and at its other end with a cone head of tempered metal, said tubular extension having an irregular surface for the engagement of an adjusting implement, whereby the cone may be rotated for longitudinal adjustment upon a shaft, substantially as described.

15. An adjusting cone for bearings comprising a barrel of untempered metal provided at its inner end with a cone head of tempered metal, and at its outer end with a tubular extension having an irregular surface, and a metal washer shaped to fit said irregular surface, substantially as described.

16. An adjustable bearing comprising a socket and bearing cup seated therein, and a cone barrel provided with a removable tempered head having an annular shoulder to enter the bearing cup and a flange to enter the socket, said cone barrel having at its outer end a tubular extension terminating in an irregular surface, and an adjusting washer shaped to fit said irregular surface of the cone barrel, substantially as described.

17. A bearing one of the members of which is movable to automatically maintain an equal pressure upon the bearing surfaces thereof, at opposite sides of the axis of rotation, substantially as described.

18. A bearing one of the members of which is movable with relation to the other member to automatically maintain an equal pressure between the bearing surfaces of said members at opposite sides of the axis of rotation, and means to prevent the rotation of said movable member upon or within its support, substantially as described.

19. A cone for bearings comprising a barrel, and a cone head carried by said barrel and adapted to yield to compensate for imperfections in the bearing, substantially as described.

20. A cone for bearings comprising a barrel, and an independent cone head mounted thereon to permit a slight movement of the outer edge of the flange of said cone head in the direction of the length of the barrel, substantially as described.

21. A cone for bearings comprising a barrel, a washer seated near the inner end of said barrel, and a cone head loosely mounted on the inner end of said barrel and resting against said washer, substantially as described.

22. A cone for bearings comprising a barrel, a washer seated near the inner end of said barrel, a cone head loosely mounted on the inner end of the barrel and resting against said washer, and means to prevent the rotation of said cone head upon the barrel, substantially as described.

In testimony whereof I affix my signature in presence of two witnesses.

FREDERICK D. OWEN.

Witnesses:
HENRY E. COOPER,
CHAS. A. O'NEILL.

It is hereby certified that in Letters Patent No. 519,269, granted May 1, 1894, upon the application of Frederick D. Owen, of Washington, District of Columbia, for an improvement in "Bearings for Velocipedes," an error appears in the printed specification requiring the following correction, viz: In line 86, page 1, the word "engaged" should read *gaged;* and that the said Letters Patent should be read with this correction therein that the same may conform to the record of the case in the Patent Office.

Signed, countersigned, and sealed this 8th day of May, A. D. 1894.

[SEAL.]

JNO. M. REYNOLDS,
*Assistant Secretary of the Interior.*

Countersigned:

JOHN S. SEYMOUR,
*Commissioner of Patents.*